United States Patent [19]

Noba et al.

[11] Patent Number: 4,907,852
[45] Date of Patent: Mar. 13, 1990

[54] OPTICAL FIBER CONNECTOR AND METHOD FOR PRODUCING THE SAME

[75] Inventors: Kunihiro Noba, Nagoya; Yukio Sakuraba; Katsuyoshi Urano, both of Kasugai, all of Japan

[73] Assignee: Tokai Rubber Industries, Ltd., Aichi, Japan

[21] Appl. No.: 303,893

[22] Filed: Jan. 30, 1989

[30] Foreign Application Priority Data

Feb. 5, 1988 [JP] Japan ................................ 63-26379
Feb. 18, 1988 [JP] Japan ............................ 63-20152[U]
Dec. 19, 1988 [JP] Japan ........................... 63-164726[U]

[51] Int. Cl.4 ............................................. G02B 6/36
[52] U.S. Cl. ................................................ 350/96.20
[58] Field of Search ................. 350/96.20, 96.21, 96.22

[56] References Cited

U.S. PATENT DOCUMENTS

| | | | |
|---|---|---|---|
| 4,186,999 | 2/1980 | Harnood et al. | 350/96.20 |
| 4,264,128 | 4/1981 | Young | 350/96.20 |
| 4,330,171 | 5/1982 | Malsot et al. | 350/96.20 |
| 4,634,214 | 1/1987 | Cannon, Jr. et al. | 350/96.20 |
| 4,695,124 | 9/1987 | Himono et al. | 350/96.20 |
| 4,743,084 | 5/1988 | Manning | 350/96.21 |
| 4,815,809 | 3/1989 | Szostak | 350/96.20 |

Primary Examiner—William L. Sikes
Assistant Examiner—Akm E. Ullah
Attorney, Agent, or Firm—Oliff & Berridge

[57] ABSTRACT

A connector having a body and a connecting portion is molded within a mold in which an end portion of an optical fiber is fixedly positioned. The end portion of the optical fiber consists of an exposed end portion of a core of the fiber and a terminal portion of a sheath of the fiber adjacent to the exposed end portion of the core. A molten mass of a selected synthetic material is injected into the mold at a metal flow rate of 5 g/min, whereby the connector is molded integrally with the end portion of the optical fiber, such that the exposed end portion of the core is bonded to the connecting portion, while the terminal portion of the sheath is bonded to the body of the connector. The mold is maintained at a temperature not higher than the softening point of the optical fiber, and the molten resin mass is maintained at a temperature which is higher than the solftening point but is not higher than a temperature 150° C. higher than the softening point.

7 Claims, 8 Drawing Sheets

OPTICAL FIBER CONNECTOR AND METHOD FOR PRODUCING THE SAME

BACKGROUND OF THE INVENTION

1. Field of the Invention

The present invention relates generally to a connector attached to an end portion of an optical fiber for optical connection of the optical fiber to an end of another optical fiber, and a method suitable for producing the same. More particularly, the present invention is concerned with such an optical fiber connector which is simple in construction and highly durable, and an improved method for producing the same.

2. Discussion of the Prior Art

Optical fibers have been recently used as communication cables in data communication systems. These optical fibers are formed of glass fibers or plastic materials. From the standpoint of cost of manufacture, the plastic optical fibers have been increasingly substituted for the optical fibers of glass materials. The optical fibers are connected end to end for long-distance data communication, or connected to various optical devices. For this purpose, an optical fiber connector as indicated at 1 in FIG. 17 is known.

Described more specifically, the optical fiber connector 1 includes a body 3 having a recess 2 formed in its upper surface, and a covering member 4 which engages the recess 2. The body 3 is provided with a plurality of first engagement projections 5 formed on opposite inner side surfaces of the recess 2, while the covering member 4 is provided with a plurality of second engagement projections 7 formed on its lower surface. These first and second engagement projections 5, 7 cooperate with each other to grip and hold an optical fiber 6 when the recess 2 is closed by the covering member 4.

The body 3 is formed with a connecting portion 8 extending from an outer surface thereof. The connecting portion 8 is a generally rectangular member having a square opening formed therethrough in the direction of extension. The body 3 has an extension sleeve 9 which extends through the square opening of the connecting portion 8. The extension sleeve 9 has a hole 9a whose diameter is determined so as to accommodate an end portion of a core 6a of the optical fiber 6. The core 6a has a high refractive index and is covered by a clad layer having a comparatively low refractive index.

The body 3 has two round holes 10 formed through the opposite side walls such that the two holes 10 are aligned in coaxial relation with the hole 9a of the extension sleeve 9. The hole 10 communicating with the hole 9a is not shown in FIG. 17. The holes 10 have diameters sufficient to accommodate the diameter of a sheath 6b of the optical fiber 6. To attach the optical fiber 6 to the connector 1, the sheath 6b is removed from the end portion of the fiber 6 to expose the core 6a, and the end portion of the fiber 6 is inserted through the holes 10 such that the exposed end portion of the core 6a is received within the hole 9a of the extension sleeve 9. Then, the covering member 4 is installed in the recess 5 such that the sheath 6b is gripped at its diametrically opposite position by the first and second engagement projections 5, 7, as shown in FIG. 18. By connecting the body 3 of the connector 3 at its connecting portion 8 to a desired optical device or component, the core 6a of the optical fiber 6 is optically connected to the device or component.

Another type of an optical fiber connector as indicated at 12 in FIG. 19 is also known in the art. The connector 12 is an injection-molded article which has a large-diameter hole 11a, and a small-diameter hole 11b which is aligned with the large-diameter hole 11a. To fix the optical fiber 6 to this connector 12, the circumferential surface of the sheath 6b of the optical fiber 6 is coated with a suitable adhesive, and the end portion of the fiber 6 is inserted through the connector 12, such that the exposed end portion of the core 6a is received in the small-diameter hole 11b, while the end portion of the sheath 6b received in the large-diameter hole 11a is bonded to the inner surface of the hole 11a.

However, the optical fiber connector 1 shown in FIG. 17 suffers from a tendency that the optical fiber 6 is easily separated or pulled off from the body 3 when a tensile force is applied to the connector 3 or optical fiber 6. Namely, a relatively small tensile force applied to the connector or optical fiber 3, 6 may exceed a friction force between the sheath 6b of the optical fiber 6 and the engagement projections 5, 7 of the body 3 and covering member 4 which grip the sheath 6b. Further, the connector 1 has a comparatively large number of components and tends to be large-sized.

While the above problem is not encountered on the connector 12 shown in FIG. 19, the connector 12 as well as the connector 1 suffers from another problem. That is, the hole 9a formed through the extension sleeve 9 of the connector 1 and the small-diameter hole 11b formed through the connector 12 are larger in diameter than that of the core 6a of the optical fiber 6, so that these holes 9a, 11b may receive the core 6a. Consequently, the core 6a is more or less misaligned with the hole 9a, 11b, and is therefore offset from the axis of an optical fiber to which the core 6a of the fiber 6 is optically connected. This results in a reduced area of optical communication at the connected ends of the two optical fibers, and an increased amount of optical propagation loss. In some instances, an aqueous component may enter a gap or clearance formed around the outer circumferential surfaces of the cores at the connected ends of the optical fibers. The aqueous component may have an adverse effect on the optical signal transmission through the optical fibers.

SUMMARY OF THE INVENTION

It is therefore a first object of the present invention to provide a simple, small-sized optical fiber connector which has a sufficient tensile resistance to removal from an optical fiber and which permits improved alignment accuracy of the optical fiber.

A second object of the invention is to provide a method suitable for producing such an optical fiber connector.

The first object may be achieved according to one aspect of the present invention, which provides an optical fiber connector assembly for optically connecting end to end a first optical fiber and a second optical fiber, each fiber having a core and a sheath covering the core, the assembly comprising and end portion of the first optical fiber, and a connector integrally formed of a synthetic resin in bonded relation with an outer circumferential surface of the end portion of the first optical fiber. The end portion of the first optical fiber consists of an exposed portion of the core which is exposed at one end of the first optical fiber by removal of a corresponding part of the sheath, and a terminal portion of the sheath which is adjacent to the exposed portion of the core. The connector includes a body portion in which the terminal portion of the sheath is fixed accommodated during molding of the connector, and a connecting portion which integrally extends from the body portion and in which the exposed portion of the core is fixedly accommodated during molding of the connector. An extreme end of the exposed portion of the core is exposed at an end of the connecting portion of the connector, for optial connection with an extreme end of the second optical fiber.

Unlike the conventional connector which uses engagement projections for gripping the end portion of an optical fiber by frictional contact therewith, the instant connector assembly is producing by molding the connector so as to surround the end portion of the optical fiber in bonded relation with the surface of the optical fiber. Accordingly, the end portion of the optical fiber is securely fixed to the connector during molding of the connector. Further, the one-piece connector is simple in construction and small-sized. Further, there exists no conventionally encountered problem of a gap or clearance left between the outer surface of the optial fiber and the connecting and body portions of the connector in which the end portion of the optical fiber is embedded in coaxial relation with the connecting portion. Accordingly, the end portion of the optical fiber is precisely positioned in aligned relation with the connector, and therefore with the optical fiber to which the instant connector assembly is optically connected. Hence, the instant optical fiber connector does not suffer from an optical propagation loss due to such a gap or clearance as indicated above.

The length of contact between the outer circumferential surface of the end portion of the first optical fiber and the connector is preferably held within a range between 5.4 mm and 22 mm, for increased tensile strength and reduced optical propagation loss. The body portion of the connector may consist of a tapered portion which has a small-diameter end remote from the extreme end of the exposed portion of the core. In this case, the tapered portion may have a recess formed in the end face of the small-diameter end. The body portion of the connector may have a void formed therein such that the terminal portion of the sheath is partially exposed to the void.

The connector may be preferably molded by injecting the synthetic resin in a molten state into a cavity of a mold in which the end portion of the first optical fiber is set in alignment with a portion of the mold cavity which corresponds to the connecting portion of the connector to be formed.

The second object indicated above may be accomplished according to another aspect of the present invention, which provides a method of producing an optical fiber connector assembly for optically connecting end to end a plastic first optial fiber and a second optical fiber, each optical fiber having a core and a sheath covering the core, the method comprising the steps of: removing an end portion of the sheath of the plastic first optical fiber to obtain an exposed end portion of the core, the exposed end portion of the core and a terminal portion of the remaining sheath adjacent to the exposed end portion of the core cooperating with each other to form a connecting end portion of the first optical fiber; preparing a mold having a cavity for forming a connector having a body and a connecting portion for optical connection of the connecting end portion of the first optical fiber to the second optical fiber; setting the connecting end portion of the first optical fiber in the mold such that the connecting end portion extends through the cavity and fixed in the mold, in coaxial relationship with a portion of the cavity which corresponds to the connecting potion of the connector; maintaining an interior of the mold at a temperature not higher than a softening point of the first optical fiber; and preparing a molten mass of a material for forming the connector, and injecting the molten mass into the cavity at a melt flow rate or melt index not lower than 5 g/min., while the molten mass to be injected is maintained at a temperature which is higher than the softening point of the first optical fiber but is not higher than a temperature which is 150° C. above said softening point. Thus, the connector is formed of the material in integrally bonded relationship with an outer surface of the connecting end portion of the first optical fiber.

According to the above method, the molten mass of the material maintained at a temperature not higher than a temperature 150° C. above the softening point of the optical fiber is poured into the mold cavity at a flow rate of 5 g/min. The molten mass is rapidly injected into the mold in which the end portion of the optical fiber is properly aligned and which is maintained at a temperature lower than the temperature of the injected molten mass. Accordingly, the injected molten mass may be relatively rapidly cooled and solidified due to heat dissipation through the mold, and the connecting end portion of the first optical fiber is protected from otherwise possible misalignment with the connecting portion, and melting and/or deformation due to thermal energies of the mold and the molten mass of the material, whereby the optical propagation loss of the produced optical fiber connector is maintained at a relatively reduced level. Further, the instant method permits the use of a material having a comparatively high melting point for the connector, and therefore provides the connector with an increased heat resistance. Further, the injection molding of the connector in integrally bonded relation with the connecting end portion of the optical fiber makes it possible to produce a simple and small-sized optical fiber connector assembly, and assures a large force of attachment of the optical fiber to the connector.

The material for the connector may be selected from a group of synthetic resins which shrinks when a molten mass thereof is cooled and solidified within the cavity of the mold.

At least one pin may be set in the mold such that each pin is held at one of its oppose ends in contact with the connecting end portion of the optical fiber and projects out of the mold at the other end. In this case, the pin or pins serve to dissipate heat from the interior of the mold into the surrounding atmosphere, as well as form a corresponding hole or holes for engagement with a corresponding projection or projections formed on the inner surface of a boot used to cover at least the body portion of the connector.

The mold is provided with at least one injection aperture through which the molten mass of the material for the connector is poured into the mold cavity. The injection aperture or apertures is/are formed so as to extend perpendicularly or parallel to the axis of the connecting end portion of the optical fiber.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1A:
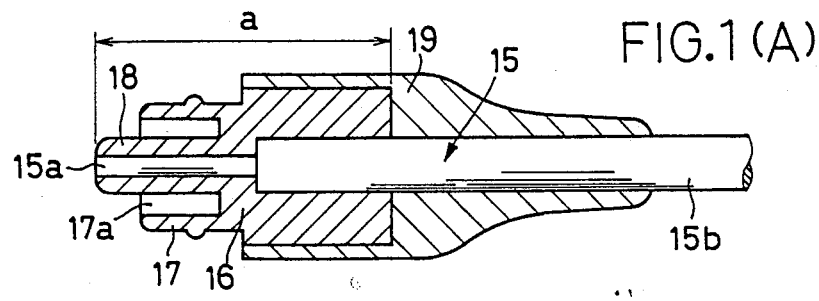
FIG. 1(A) is an elevational view in longitudinal cross section of one embodiment of a optical fiber connector of the invention.
Figure 1B:
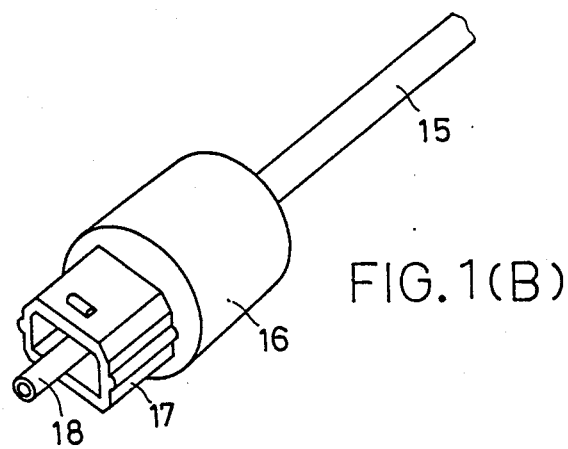
FIG. 1(B) is a perspective view of the connector of FIG. 1(A) with its rubber boot removed

Referring first to FIGS. 1(A) and 1(B), reference numeral 15 denotes an optical fiber which consists of a core 15a and a sheath 15b which covers the core 15a. The core 15a has a central core portion with a diameter of 980 microns which is formed of a polymethyl methacrylate and which is covered by a 20-micron thick clad layer of a fluorine-contained resin. The sheath 15b covering the core 15a is formed of polyethylene. The sheath 15b is removed from an end portion of the optical fiber 15, to expose the core 15a over a suitable length.

Reference numeral 16 designates an optical fiber connector which is made of polyacetal and is formed integrally with the end portion of the optical fiber 15 which consists of the exposed core 15a and a suitable length of the adjacent end portion of the sheath 15b, such that the end portion of the fiber 15 is fixedly embedded in the mass of the connector 16. The connector 16 includes a relatively small-sized connecting portion 17 formed so as to extend from one of its opposite ends. The connecting portion 17 has a recess 17a formed in its free end section. The connector 16 further has a cylindrical protrusion 18 formed on the bottom of the recess 17a, so as to extend through a central portion of the recess 17a. The cylindrical protrusion 18 has a central bore in which the exposed core 15a is coaxially received and integrally bonded.

Reference numeral 19 designates a protective rubber boot which is removably attached to the outer circumferential surface of the rear end portion of the connector 16 on the side of the sheath 15b. The length "a" of contact of the end portion of the optical fiber 15 with the connector 16 is 15 mm.

Figure 2:
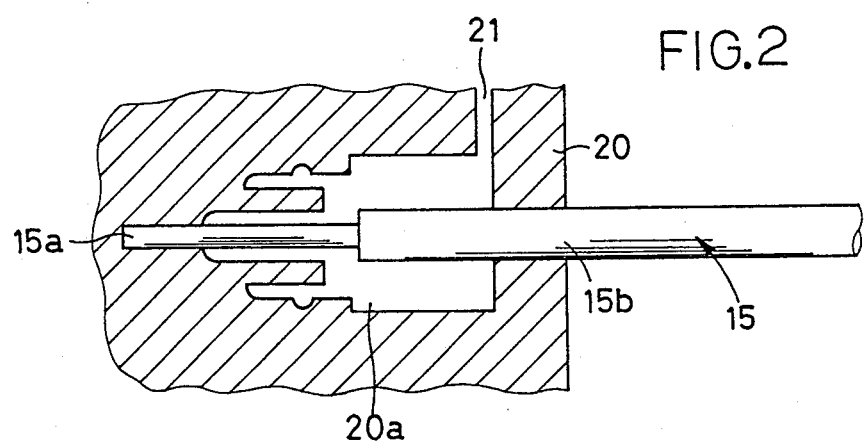
FIG. 2 is an elevational view in longitudinal cross section, showing a method for producing the connector of FIG. 1(A)

The connector 16 integrally connected to the end portion of the optical fiber 15 as shown in FIGS. 1(A) and 1(B) is produced in the following manner:

Initially, the end portion of the sheath 15b is removed over a suitable length, to expose the corresponding end portion of the core 15a. Then, the end portion of the fiber 15 including a suitable length of the sheath 15b is set in a mold 20 which has a mold cavity 20a for forming the connector 16, as shown in FIG. 2. Before the end portion of the optical fiber 15 is inserted through the mold 20, the mold 20 is heated to a temperature lower than the softening point of the material of the core 15a (which is lower than the softening point of the material of the sheath 15b), and the end portion of the optical fiber 15 is made exactly straight. In this condition, the end portion of the optical fiber 15 is inserted through the mold 20, such that the end portion of the fiber 15 is aligned in coaxial relation with a cylindrical section of the cavity 20a which corresponds to the cylindrical protrusion 18 of the connector 16 to be formed. Then, a molten mass of polyacetal is injected into the mold cavity 20a through an injection aperture 21 formed through the mold 20. The molten polyacetal mass to be injected is kept at a temperature which is higher than the softening point of the core 15a but not higher than a temperature 150° C. above the softening point, and the melt flow rate or metal index of the molten polyacetal mass is held to be at least 5 g/min. Thus, the connector 16 corresponding to the profile of the cavity 20a is formed integrally with the end portion of the optical fiber 15.

While the molten polyacetal mass within the mold cavity 20a is in the process of solidification, the polyacetal mass is contracted or shrunk by approximately 2.5%, whereby the end portion of the optical fiber 15 within the cavity 20a is securely bonded to the solidified connector 16.

After the assembly of the formed connector 16 and the end portion of the optical fiber 15 is removed from the mold 20, the end portion of the core 15a which projects from the end face of the cylindrical protrusion 18 is cut off. Further, the protective rubber boot 19 is fitted on the connector 16 and an exposed portion of the optical fiber 15 adjacent to the connector 16. Thus, the connector 16 is formed as an integral part of the end portion of the fiber 15.

The optical fiber 15 is optically connected to another optical fiber, by connecting the connecting portion 17 to an appropriate device or component such that the end of the core 15a is positioned in alignment with the corresponding end of the optical fiber to which the fiber 15 is connected.

While the temperature of the mold 20 is raised by a thermal energy of the molten polyacetal mass within the cavity 20a during molding of the connector 16, the mold 20 is cooled by water or other means, so that the mold 20 can be used for the next cycle of use for producing another connector 16 with another piece of the optical fiber 15. Namely, the mold 20 is kept at a temperature not higher than the softening point of the optical fiber 15.

Figure 3:
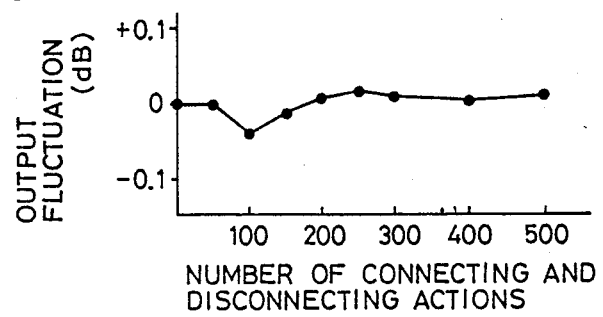
FIG. 3 is a graph indicating a relationship between the number of connecting and disconnecting actions of the connector, and the fluctuation in the optical output from an optical fiber to which the connector of FIG. 1(A) is connected.

The thus prepared assembly of the connector 16 and the optical fiber 15 was subjected to a connection and disconnection test, in which the connector 16 was alternately connected and disconnected to and from an optical device, 500 times. The amount of fluctuation in the optical output from an optical fiber to which the connector 16 is connected is indicated in the graph of FIG. 3. It will be understood from this graph that the fluctuation was maintained at a relatively small level. The optical propagation loss of the optical fiber 15 was as low as 9.2 dB.

Figure 4:
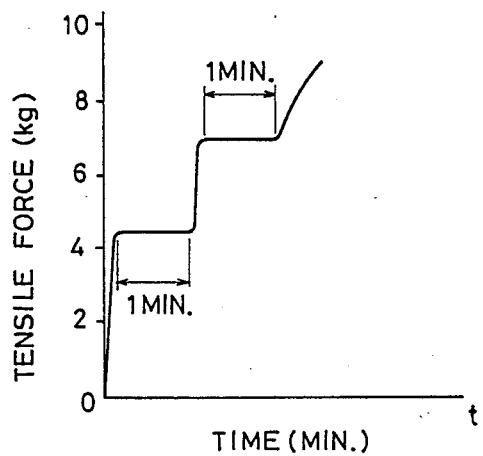
FIG. 4 is a graph indicating the result of a tensile load test of the connector.

The assembly 15, 16 was also subjected to a tensile load test, in which the optical fiber 15 and the connector 16 were pulled in opposite directions. The result is indicated in FIG. 4. Namely, the fiber 15 and connector 16 remained in a bonded condition for one minute with a tensile load of 4 kg applied thereto. The tensile load was then increased to 7 kg, and the assembly 15, 16 still resisted to this load. As the tensile load was further increased, the optical fiber 15 began to be elongated, but the fiber 15 was not separated or removed from the connector 16. A comparative test was conducted on the conventional connector 1 shown in FIG. 17. The test revealed the sparation of the optical fiber 6 from the connector 1 when the tensile load applied thereto was 7.5 kg. Hence, the instant connector-optical fiber assembly 15, 16 has a considerably higher degree of resistance to a tensile load, and is considered to be sufficiently durable in operation, as compared with the known connector 1.

The connector 16 was also formed by using different materials other than polyacetal. That is, the connector 16 formed of nylon (which has a shrinkage percentage of 0.3–0.8% upon solidification) exhibited the tensile strength of 8.7 Kg, and the connector 16 formed of polypropylene (which has a shrinkage percentage of 1.0–1.5%) exhibited the tensile strength of 13.0 Kg. Further, the three specimens were formed of a material having a shrinkage percentage of 0.3%, by changing the length "a" of contact between the optical fiber 15 and the connector 16. The tensile strength values of these specimens were 4.3 Kg, 8.7 Kg and 13.0 Kg, where the lengths "a" were 5 mm, 10 mm and 15 mm, respectively.

As described above, the connector 16 according to the instant embodiment is prepared by using the mold 20 kept at a temperature not higher than the softening point of the core 15a of the optical fiber 15, and injecting the molten material for the connector into the mold 20 such that the temperature of the material is kept below the temperature 150° C. above the softening temperature of the core 15a while the melt flow rate of the material is kept not less than 5 g/min. According to this method of production of the connector 16, the material is injected into the mold 20 at a comparatively high rate, and the injected mass within the mold cavity 20a is rapidly cooled and solidified due to heat dissipation. Consequently, the end portion of the optical fiber 15 within the connector 16 is almost free of radial misalignment or offsetting with respect to the connector 16. The specimens produced according to the present embodiment had a maximum radial misalignment of as small as 10 microns, while the specimen of FIG. 17 had a maximum radial misalignment of 30 microns. Therefore, the radial misalignment of the instant connector 16 with respect to the optical fiber to which the optical fiber 15 is connected by means of the connector 16 is maintained at a considerably low level, and the optical propagation loss is accordingly reduced.

Further, the molding process in the conditions specified above prevents melting and resulting deformation of the core 15a and/or sheath 15b of the optical fiber 15 due to the thermal energies of the mold 20 and the molten polyacetal mass, and also prevents deformation of the optical fiber 15 prior to the filling of the mold cavity 20a, which would occur if the injection speed of the material was excessively low. In other words, the connector 16 may be made of a material which has a relatively high melting point, whereby the connector 16 may have a relatively high heat resistance.

It is also significant to note that the injection molding of the connector 16 integrally with the end portion of the optical fiber 15 assures a considerable increase in the bonding strength between the connector 16 and the fiber 15, and freedom of a gap or clearance at the interface of the two members, which would otherwise be created accommodating an aqueous component to which the optical fiber 15 is undesirably exposed. Accordingly, the instant connector-optical fiber assembly 15, 16 is substantially free of an optical output fluctuation even after its repeated connecting and disconnecting actions with respect to an optical device. In addition, the connector 16 is a simple one-piece structure and small-sized, and is therefore easy to manufacture, as compared with the known connector 1 which consists of a large number of parts or portions.

Figure 5:
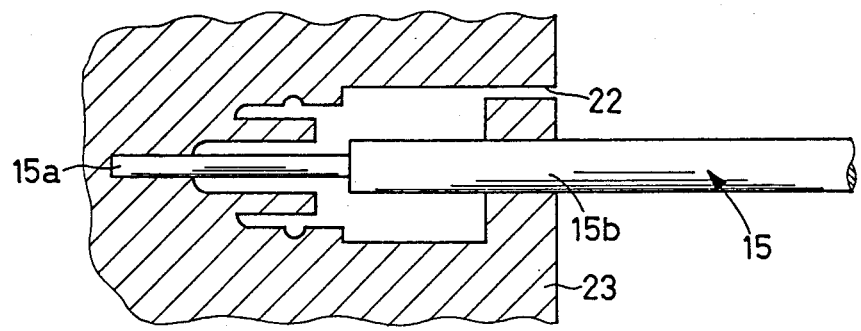
FIGS. 5 and 6 are elevational views in longitudinal cross section, showing methods for producing the connector body according to other embodiments of the invention.

Referring next to FIG. 5, there is shown a modified embodiment of the invention, which uses a mold 23 having an injection aperture 22 formed so as to extend parallel to the longitudinal direction of the optical fiber 15. This embodiment is advantageous in that the end portion of the optical fiber 15 disposed within the mold cavity is protected from bending or deflection due to a pressure of a flow of the injected molten material, in a direction perpendicular to the direction of flow of the melt. As a result, the straightness of the end portion of the optical fiber 15 is improved, whereby the optical propagation loss is accordingly reduced (down to 4.5 dB according to this embodiment).

Figure 6:
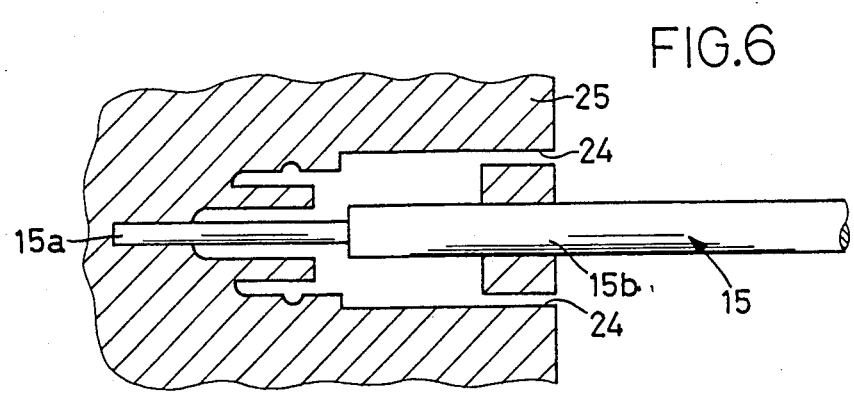

Another modification of the mold is illustrated at 25 in FIG. 6, wherein two injection apertures 24, 24 are formed on the opposite sides of the axis of the optical fiber 15, so as to extend parallel to the optical fiber. In this case, the straightness of the end portion of the optical fiber 15 is further improved, and the optical propagation loss may be reduced down to 1.9 dB.

It will be understood that the mold for injection-molding the connector 16 may be provided with three or more injection apertures, which are arranged, for example, in spaced-apart relation with each other in the circumferential direction of the optical fiber 15.

Figure 7:
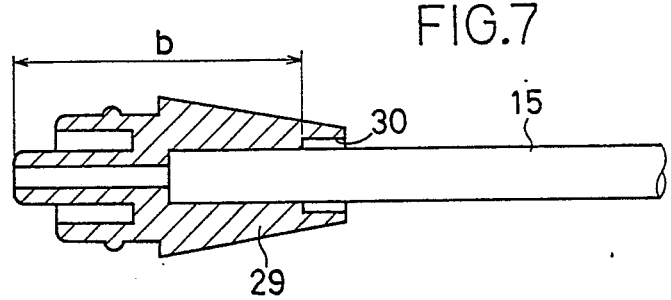
FIGS. 7 and 8 are views showing further different embodiments of the invention.
Figure 8:
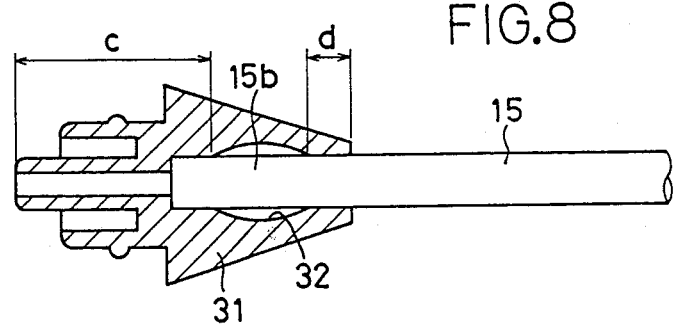

The configuration of the connector body is not limited to that shown in FIGS. 1(A) and 1(B). For instance, the connector body may have modified configurations as illustrated in FIGS. 7 and 8. A connector body 29 of FIG. 7 has a truncated conical shape and a recess 30 formed in its small-diameter rear end. A connector body 31 of FIG. 8 also have a truncated conical shape, but has a void 32 formed therein such that the sheath 15b is partially exposed to the void 32. The length "b" indicated in FIG. 7, and the length "c"+"d" indicated in FIG. 8 correspond to the length "a" of FIG. 1(A) over which the optical fiber 15 contacts the connector 16.

Figure 9:
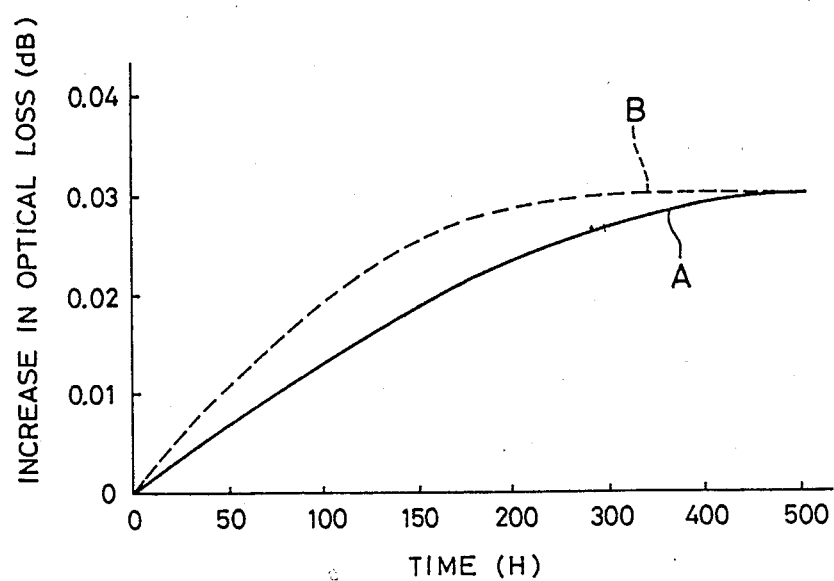
FIG. 9 is a graph indicating a relationship between the amount of increase in the optical loss and the time of use of the connector according to the invention, and that of the conventional connector.
Figure 17:
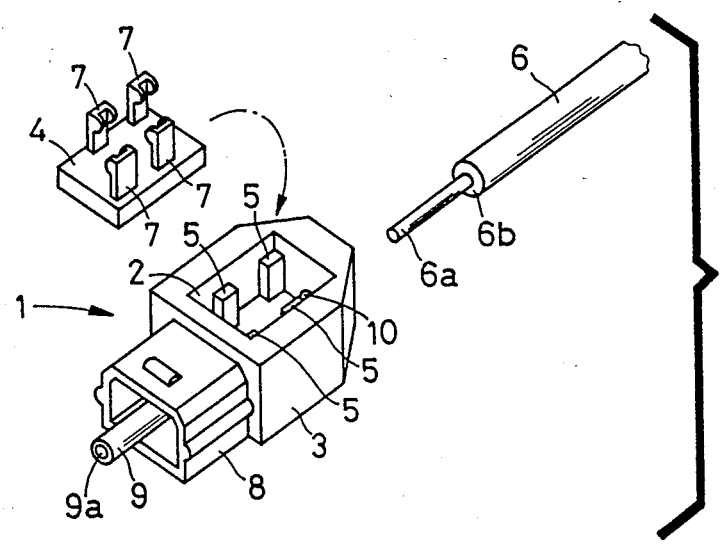
FIG. 17 is an exploded perspective view of a conventional optical fiber connector.

FIG. 9 indicates relationships between the amount of increase in the optical propagation loss and the time of use of the connector-optical fiber assemblies according to the above embodiments, and the conventional counterpart 1, 6 of FIG. 17. The assemblies according to the illustrated embodiments exhibited similarly excellent results as indicated by solid line A, while the conventional counterpart exhibited a comparatively poor result as indicated by broken line B.

Figure 10:
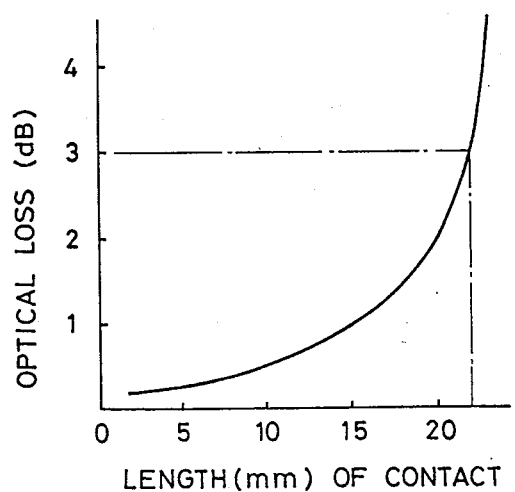
FIG. 10 is a graph indicating a relationship between the amount of optical loss and the length of contact between the connector and the optical fiber.

Referring to the graph of FIG. 10, the optical propagation loss of the illustrated embodiment of Figs. 1(A) and 1(B) is shown in relation to the length of contact between the connector body 16 and the optical fiber 15, which is represented by "a", "b" and ("c"+"d"). Since it is desirable that the optical propagation loss be held not greater than 3 dB, it is preferable that the contact length be 22 mm or shorter, as indicated in FIG. 10.

Figure 11:
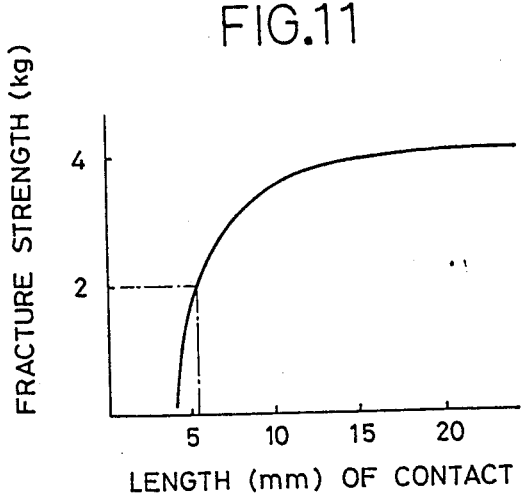
FIG. 11 is a graph indicating a relationship between the fracture strength of the end portion of the connector and the length of contact between the connector and the optical fiber.

The graph of FIG. 11 shows a relationship between the fracture strength and the contact length ("a", "b" or "c"+"d") of the connector. Since the fracture strength is desirably 2 Kg or more, the length of contact is preferably 5.4 mm or larger. Therefore, to satisfy the above desirability of the optical propagation loss and this desirability of the fracture strength, the contact length should be held within a range between 5.4 mm and 22 mm, preferably between 10 mm and 13 mm.

Figure 12:
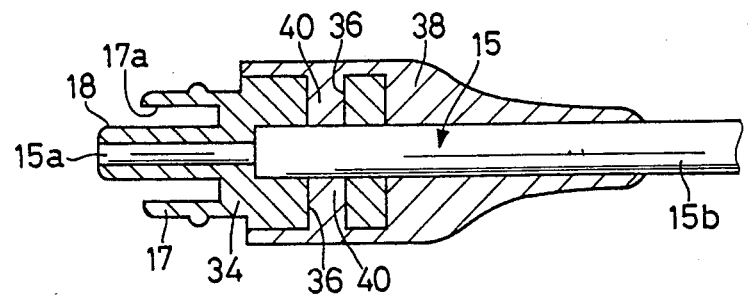
FIG. 12 is an elevational view in longitudinal cross section of a further embodiment of the present invention.
Figure 13:
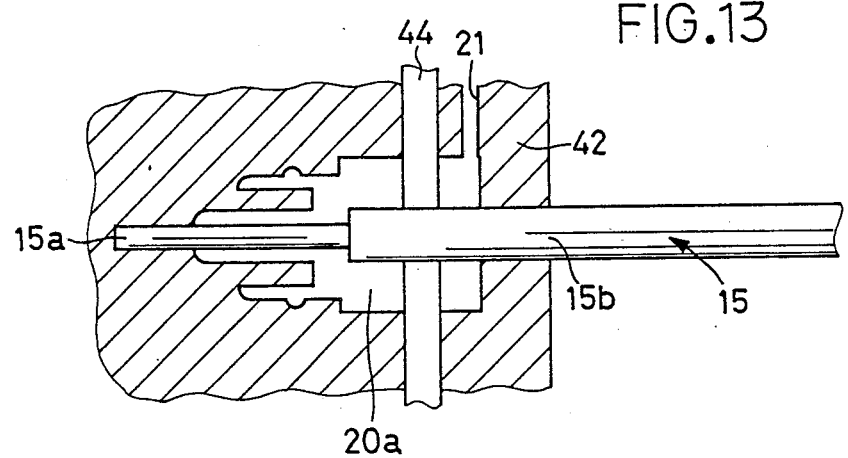
FIG. 13 is an elevational view in longitudinal cross section, showing a method for producing the connector of FIG. 12 according to a modified embodiment of the invention.

Referring to FIGS. 12 and 13, a further embodiment of the present invention will be described. For easy understanding, the same reference numerals a used in the preceding figures are used in FIGS. 12 and 13, to identify the functionally corresponding elements.

The connector of FIG. 12 is indicated at 34, which is different from the connector 16 of FIG. 1(A) in that the connector 34 has a pair of round holes 36 formed in radial directions in its rear portion such that the two round holes 36 are aligned with each other so as to extend along a straight line which passes the axis of the optical fiber 15. A rubber boot 38 is removably fitted on the connector 34, so as to cover the circumferential surface of the rear portion of the connector 34 which accommodates the end portion of the sheath 15b of the optical fiber 15. The rubber boot 38 has a pair of cylindrical projections 40 which engage the round holes 36 formed in the connector 34. The rubber boot 38 also covers a portion of the optical fiber 15 adjacent to the connector 34.

The connector 34 is formed by using an injection mold 42 shown in FIG. 13. This mold 42 uses two pins 44 for forming the round holes 36 in the connector 34. The pins 44 are disposed such that its opposite ends are held in contact with diametrically opposite parts of the circumferential surface of the sheath 15b of the fiber 15, so as to hold the end portion of the fiber 15 in precise alignment with the mold cavity 20a. The ends of the pins 44 remote from the fiber 15 are located outside the injection mold 42, so that heat within the mold 42 may be transferred out into the surrounding atmosphere.

With the end portion of the optical fiber 15 thus held and positioned by the pins 44 within the mold 42, a molten mass of polyacetal is injected into the mold cavity 20a, in the same manner as described above with respect to the embodiment of FIGS. 1(A) and 1(B). The produced connector-optical fiber assembly 34, 15 exhibited the same result as that of the first embodiment, namely, the connector 34 and the fiber 15 was not separated form each other with a tensile force of 13 Kg applied thereto.

The instant embodiment is further advantageous in that the round holes 40 formed by the pins 44 cooperate with the cylindrical projections 40 to increase a force of attachment of the rubber boot 38 to the connector 34.

Figure 14:
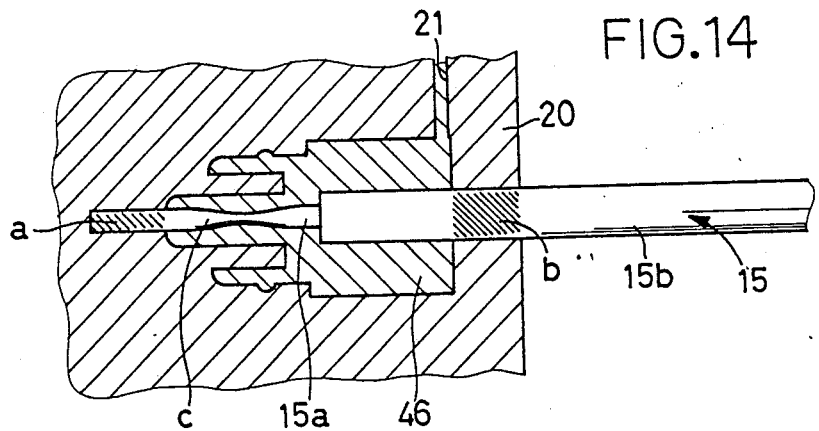
FIGS. 14, 15 and 16 are elevational cross sectional views explaining undesired conditions that may be encountered in producing the connector.

While the method of producing the connector according to the present invention has been described for illustrative purpose only, it is to be noted that the connector should also function to thermally protect the end portion of the optical fiber 15. That is, the connector 16, 29, 31, 34 should have a heat resistance higher than that of the optical fiber 15. The core 15a of the fiber 15 has a melting point of about 80° C. In view of this, a synthetic resin material 14 to be injected into the mold 20 as illustrated in FIG. 14 by way of example should have a melting point higher than that of the core 15a (the melting point of the sheath 15b being higher than that of the core 15a). The resin material 14 is heated, preferably, to about 180° C., and the molten resin 14 is poured into the mold 20. Below 180° C., the fluidity of the molten mass of the resin 14 within the mold cavity is insufficiently low. Further, the mold 20 itself should be kept at a temperature higher than a predetermined point, in order to maintain the fluidity of the molten resin mass 14.

Figure 15:
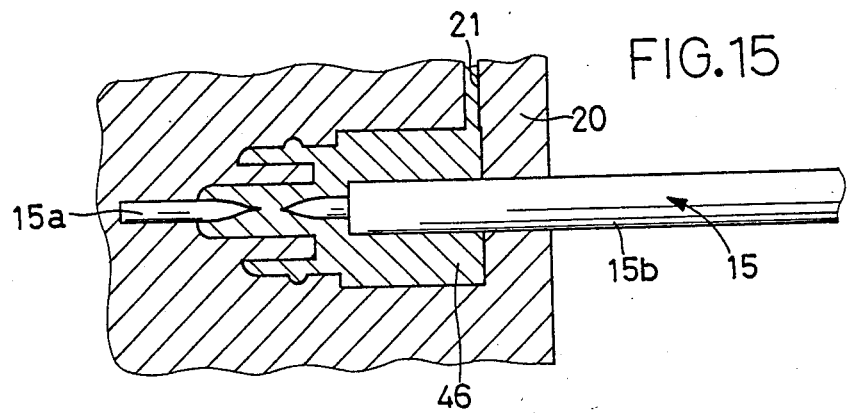
Figure 16:
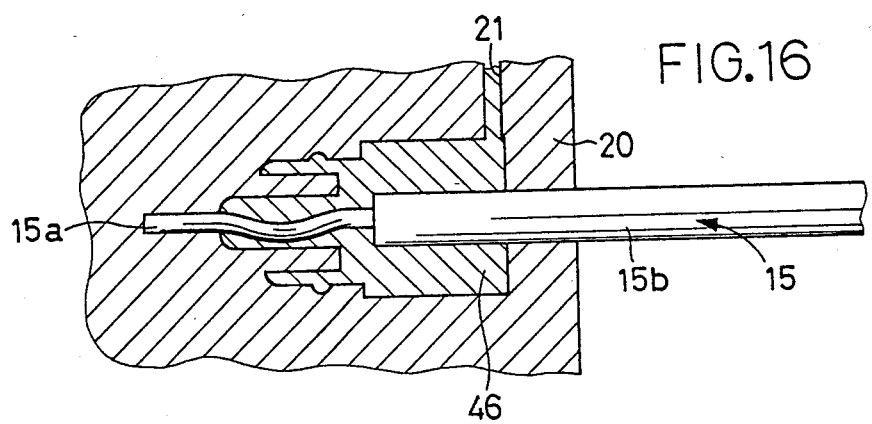
Figure 18:
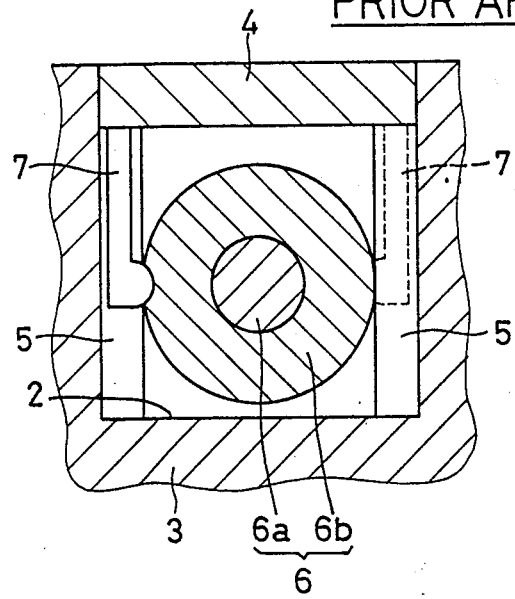
FIG. 18 is a fragmentary elevational view in transverse cross section of the connector of FIG. 17.
Figure 19:
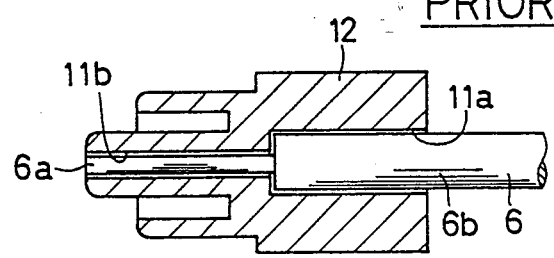
FIG. 19 is an elevational view in longitudinal cross section of another conventional optical fiber connector.

Extensive study and research have been made in connection with the temperatures of the mold 20 and the resin material 46, and revealed the following problems.

Where the temperature of the mold 20 is not lower than the softening point of the core 15a of the optical fiber 15, the end portion of the core 15a and a portion of the sheath 15b of the optical fiber 15 may be melted due to heat of the mold 20, as indicated at "a" and "b" in FIG. 14, and an intermediate portion of the core 15a may be melted and thinned prior to the injection of the resin material 46 into the mold 20, as indicated at "c" in FIG. 14. Further, the core 15a may possibly be disconnected as illustrated in FIG. 15, if the temperature of the molten resin material 46 is higher by more than 150° C. than the softening point of the core 15a. The research also indicated a problem associated with the melt flow rate of the molten resin mass 46. More specifically, where the melt flow rate of the resin melt 46 (flow rate at 190° C. at 2.16 Kg load, according to the Japanese Industrial Standard, JIS-K-7210) is 5 g/min or lower, the filling of the mold cavity with the resin melt 46 is excessively slow, whereby the upper and lower masses of the resin melt 46 within the mold cavity have different degrees of fluidity, resulting in a pressure difference between the upper and lower portions of the mold cavity. This may cause deformation such as bending or deflection of the core 15a of the optical fiber 15, as indicated in FIG. 16. Accordingly, the connector obtained may suffer from an excessively large optical propagation loss, or may not serve its intended function.

In view of the above study and research, it was found desirable to maintain the mold 20 at a temperature not higher than the softening point of the core 15a of the optical fiber 15, and inject the resin material 46 into the mold cavity, at a metal flow rate not lower than 5 g/min, while the temperature of the molten resin material 46 is maintained at a temperature which is higher than the above softening point but which does not exceeds the softening point by 150° C. In this condition, the molten resin material 46 injected into the mold cavity may be rapidly cooled and solidified with heat dissipation through the mold 20, whereby the core 15a and sheath 15b of the optical fiber 15 are protected from otherwise possible melting and deformation due to heat of the mold 20 and resin material 6, or bending or deflection of the fiber 15 proir to the filling of the mold cavity, due to an excessively low rate of flow of the resin melt 46. Thus, the obtained connector-optical fiber assembly has satisfactory alignment between the connector and the optical fiber, assuring improved optical propagation efficiency or reduced optical propagation loss, when used for optical connection with another optical fiber.

In the illustrated embodiments, the end portion of the optical fiber 15 is bonded or secured to the connector 16, 29, 31, 34 by utilizing the contraction or shrinkage of the resin material of the connector during injection molding thereof. However, the following methods may be practiced to effect the bonding between the connector and the optical fiber.

(1) A resin material exhibiting an adhesive property is used for the connector.

(2) Such an adhesive resin material is mixed with the synthetic resin material (polyacetal) as used in the illustrated embodiment.

(3) A coupling agent is mixed with the resin material as used in the illustrated embodiments.

According to the method (1), thermoplastic urethane resins, epoxy resins and unsaturated polyester resins may be used. In the method (2), 10–50 parts of epoxy resins, acrylic resins and unsaturated polyester resins may be mixed with 100 parts of the selected material for the connector. In the method (3) 0.1–5 parts of a silane- or titanium-based coupling agent may be mixed with 100 parts of the selected material for the connector. A connector-optical fiber assembly produced by using these materials may have similar optical and physical properties and advantages (e.g., resistance to tensile force) as described above.

The core 15a of the optical fiber 15 may be forded of acrylic resins, polycarbonate and other suitable plastics, and glass fiber. The sheath 15b may be formed of polyethylene and polyvinyl chloride. Further, the connector which is formed of polyactal in the illustrated embodiment may be formed of thermoplastic resins such as polyethylene terephthalate (shrinkage percentage: 1–2%), polypropylene (shrinkage percentage: 1–1.5%) and polyamide (shrinkage percentage: 0.3–0.8%), or suitable thermosetting resins. While the rubber boots 19, 38 are formed of a rubbery material, a boot formed of polyethylene, polyvinyl chloride or other resins may be used.

It is also possible that the adjacent portions of the core 15a and sheath 15b within the mold cavity are coated with a suitable thermosetting resin, in order to avoid a turbulent flow of the material around the above-indicated adjacent portions, during molding of the connector.

While the present invention has been described in its presently preferred embodiments, by way of example only, it is to be understood that the invention is not limited to the precise details of the illustrated embodiments, but may be embodied with various changes, modifications and improvements, which may occur to those skilled in the art, without departing from the spirit and scope of the invention defined in the following claims.

What is claimed is:

1. An optical fiber connector assembly for optically connecting end to end a first optical fiber and a second optical fiber, each of said optical fiber having a core and a sheath covering said core, said assembly comprising:

an end portion of said first optical fiber, said end portion consisting of an exposed portion of said core which is exposed at one end of said first optical fiber by removal of a corresponding part of said sheath, and a terminal portion of said sheath adjacent to said exposed portion of the core; and a connector integrally formed of a synthetic resin in bonded relation with an outer circumferential surface of said end portion of said first optical fiber, said connector including a body portion in which said terminal portion of said sheath is fixedly accommodated, and a connecting portion which integrally extends from said body portion and in which said exposed portion of said core is fixedly accommodated in coaxial relation with said connecting portion, an extreme end of said exposed portion of said core being exposed at an end of said connecting portion, for optical connection with an extreme end of said second optical fiber.

2. An optical fiber connector assembly according to claim 1, wherein a length of contact between said outer circumferential surface of said end portion of said first optical fiber and said connector is within a range between 5.4 mm and 22 mm.

3. An optical fiber connector assembly according to claim 1, wherein said body portion of said connector consists of a tapered portion which has a small-diameter end remote from said extreme end of said exposed portion of said core.

4. An optical fiber connector assembly according to claim 3, wherein said tapered portion has a recess formed in an end face at said small-diameter end.

5. An optical fiber connector assembly according to claim 1, wherein said body portion of said connector has a void formed therein such that a part of said terminal portion of said sheath is exposed to said void.

6. An optical fiber connector assembly according to claim 1, wherein said connector is molded by injecting said synthetic resin in a molten state into a mold in which said end portion of said first optical fiber is set.

7. An optical connector assembly according to claim 1, which has a tensile strength of at least 13 Kg.

* * * * *